United States Patent [19]

Davison

[11] Patent Number: 4,682,159

[45] Date of Patent: Jul. 21, 1987

[54] APPARATUS AND METHOD FOR CONTROLLING A CURSOR ON A COMPUTER DISPLAY

[75] Inventor: Keith K. Davison, Brookline, Mass.

[73] Assignee: Personics Corporation, Concord, Mass.

[21] Appl. No.: 622,732

[22] Filed: Jun. 20, 1984

[51] Int. Cl.⁴ .............................................. G09G 1/00
[52] U.S. Cl. ..................................... 340/709; 340/706; 340/825.19; 178/18
[58] Field of Search ............... 340/712, 706, 707, 709, 340/825.19, 705; 400/87; 178/18, 19; 358/112

[56] References Cited

U.S. PATENT DOCUMENTS

| | | | |
|---|---|---|---|
| 2,268,643 | 1/1942 | Crosby | 343/14 |
| 3,121,955 | 2/1964 | King | 33/1 P |
| 3,122,665 | 2/1964 | Bailey | 310/26 |
| 3,134,099 | 5/1964 | Woo | 340/347 AD |
| 3,383,651 | 5/1968 | Koblick | 367/127 |
| 3,399,401 | 8/1968 | Ellis et al. | 340/710 |
| 3,439,317 | 4/1969 | Miller et al. | 340/347 AD |
| 3,500,301 | 3/1970 | Meier | 367/93 |
| 3,504,334 | 3/1970 | Turnage, Jr. | 367/127 |
| 3,541,521 | 11/1970 | Koster | 340/710 |
| 3,559,161 | 1/1971 | Raudsep | 367/117 |
| 3,651,687 | 3/1972 | Dory | 73/67.8 R |
| 3,673,327 | 6/1972 | Johnson et al. | 178/18 |
| 3,696,409 | 10/1972 | Braaten | 340/365 |
| 3,731,273 | 5/1973 | Hunt | 367/13 |
| 3,732,557 | 5/1973 | Evans et al. | 340/710 |
| 3,783,679 | 1/1974 | Jackson | 73/67.7 |
| 3,792,243 | 2/1974 | Appel et al. | 235/151 |
| 3,821,469 | 6/1974 | Whetstone et al. | 178/18 |
| 3,835,464 | 9/1974 | Rider | 340/710 |
| 3,838,212 | 9/1974 | Whetstone et al. | 179/18 |
| 3,866,199 | 2/1975 | Eberhard et al. | 340/685 |
| 3,869,694 | 3/1975 | Merchant et al. | 367/117 |
| 3,885,076 | 5/1975 | Heidenreich et al. | 428/195 |
| 3,885,096 | 5/1975 | Inuiya | 178/15 |
| 3,892,963 | 7/1975 | Hawley et al. | 250/231 |
| 3,924,450 | 12/1975 | Uchiyama et al. | 73/67 |
| 3,987,685 | 10/1976 | Opocensky | 74/471 |
| 4,012,588 | 3/1977 | Davis et al. | 178/18 |
| 4,035,762 | 7/1977 | Chamuel | 367/117 |
| 4,059,010 | 11/1977 | Sachs | 73/596 |
| 4,109,145 | 8/1978 | Graf | 250/201 |
| 4,124,838 | 11/1978 | Kiss | 367/99 |
| 4,148,014 | 4/1979 | Burson | 340/709 |
| 4,149,716 | 4/1979 | Scudder | 273/1 E |
| 4,175,441 | 11/1979 | Urbanek et al. | 73/599 |
| 4,200,921 | 4/1980 | Buckley | 367/87 |
| 4,209,255 | 7/1980 | Heynau et al. | 356/152 |
| 4,254,485 | 3/1981 | Akita | 367/117 |
| 4,276,622 | 7/1981 | Dammeyer | 367/118 |
| 4,279,027 | 7/1981 | Van Sloun | 367/125 |
| 4,285,053 | 8/1981 | Kren et al. | 367/99 |
| 4,287,769 | 9/1981 | Buckley | 73/627 |
| 4,303,914 | 12/1981 | Page | 340/706 |
| 4,313,227 | 1/1982 | Eder | 455/617 |
| 4,315,240 | 2/1982 | Spooner | 340/27 R |
| 4,315,241 | 2/1982 | Spooner | 340/27 R |
| 4,318,096 | 3/1982 | Thornburg et al. | 340/706 |
| 4,331,954 | 5/1982 | Bauman et al. | 340/706 |
| 4,334,431 | 1/1982 | Kohno et al. | 73/597 |
| 4,340,878 | 7/1982 | Spooner et al. | 340/27 R |
| 4,344,160 | 8/1982 | Gabriel et al. | 367/96 |
| 4,347,507 | 8/1982 | Spooner | 340/705 |
| 4,347,508 | 8/1982 | Spooner | 340/705 |
| 4,363,029 | 12/1982 | Piliavin et al. | 340/501 |
| 4,364,035 | 12/1982 | Kirsch | 340/710 |
| 4,369,439 | 1/1983 | Broos | 340/710 |
| 4,386,346 | 5/1983 | Levine | 340/709 |
| 4,390,873 | 6/1983 | Kirsch | 340/710 |
| 4,409,479 | 10/1983 | Sprague et al. | 250/237 |
| 4,565,999 | 1/1986 | King et al. | 340/706 |
| 4,578,674 | 3/1986 | Baker et al. | 340/710 |

*Primary Examiner*—Gerald L. Brigance
*Assistant Examiner*—Ruffin B. Cordell
*Attorney, Agent, or Firm*—Michael J. Bevilacqua

[57] ABSTRACT

Disclosed is an apparatus and method for controlling the cursor of a computer display. The apparatus includes a headset which is worn by the computer operator and an ultrasonic transmitter for transmitting sound waves which are picked up by the receivers in the headset. These sound waves are compared for phase changes, and circuitry is provided for converting the phase changes into position change data which is used by a computer to control the cursor.

25 Claims, 5 Drawing Figures

APPARATUS AND METHOD FOR CONTROLLING A CURSOR ON A COMPUTER DISPLAY

BACKGROUND OF THE INVENTION

This invention relates to an apparatus and method of controlling the cursor of a computer display and in particular to a cursor control device and method which translate motion of the head into motion of the cursor.

In many computer systems currently in use, a cursor serves as a major component of the interface between the machine and the operator of the machine. In graphics, data and word processing applications, the cursor indicates the current position of the data or text which can be edited or into which new data or text can be inserted. For many computers, the cursor is controlled simply by a key or keys on the keyboard. To move the cursor, the key or keys are depressed either a number of times corresponding to the number of position changes over which the cursor is to be moved or continuously until the cursor arrives at its desired position.

Recently, other types of cursor control devices have been developed. One such device, which is referred to as a "mouse", is designed to lie on a table or other flat surface and be moved about by hand. As the operator moves the mouse in a given direction on the table, the cursor moves in a corresponding direction. U.S. Pat. Nos. 3,541,541; 3,835,464; 3,892,963; 3,987,685; 4,390,873 and 4,409,479 provide examples of various mice.

These cursor control devices or mice operate in a number of different fashions. The mouse taught by U.S. Pat. No. 3,892,963, issued to Hawley, translates a mechanical action of bearings or other types of roller devices into an electrical signal which signifies an amount of position change. Such mechanical devices have, however, proven to be rather inconvenient to use for a number of reasons. First, when the computer is placed on a rather small table there may not be a sufficient area over which to move the mechanical device so that the wheels or other position change-indicating devices can accurately provide the full range of movement of the cursor. Second, after a substantial period of use, the mechanical moving parts of the mouse, such as the balls or wheels, become dirty and cease to provide continuous rolling action.

The "optical mouse" taught by U.S. Pat. No. 4,409,479 provides the advantage that movable parts are eliminated. This optical mouse, however, requires a significant amount of flat surface area over which is placed a special planar grid pattern for charting movement of the mouse. Also, dirt and dust will tend to block the light source or grid pattern if all of the components of the apparatus are not kept clean.

Principal among the other drawbacks of the mouse technology is that manipulating the mouse is difficult, and it often takes several hours to fully master. Once mouse manipulation is mastered, there is then the problem that it is often clumsy to go back and forth between the mouse and the keyboard when a task requires the entering of text or data into the computer. For the most part, the constant shifting required between the mouse and the keyboard makes mice virtually useless for word processing and accounting spread sheets, two of the more popular uses for personal computers with which mice are normally associated.

There are a number of other cursor control devices which suffer from any of the same shortcomings which are inherent in mice. Among these other cursor control devices are light pens, tablet pens, joy sticks, track balls and thumb wheels. For the most part, each of these devices also requires several hours of use to fully master, and the constant shifting between the cursor control device and the keyboard which is inherent in the use of mice also creates problems when using these cursor control devices.

One attempt to eliminate the problems caused by the aforementioned cursor control devices is disclosed in U.S. Pat. No. 4,369,439 issued to Broos. Broos provides a movable data entry keyboard which is mounted on a carriage. Cursor position signals are generated directly from position transducers associated with the carriage. In operation, when the operator entering data or text desires to move the cursor, a switch is activated and the keyboard is moved along a flat surface thereby resulting in corresponding movement of the cursor on the computer display. Operation of such a cursor control device is much simpler and quicker than the above-described cursor control devices because the operator's hands never leave the keyboard. The keyboard is, however, larger than conventional mice, and as a result, an area even greater that that required for mice is required for moving the keyboard. In addition, this cursor control device will require some start up learning time, and there will be some inconvenience associated with its use resulting from the fact that it is customary to type from a stationary keyboard. Typing from a constantly moving keyboard will never be as fast and easy as typing on a standard stationary keyboard.

It is therefore a principal object of the present invention to provide a cursor control device which is easy to use and which does not require significant start-up time for its initial use.

It is a further object of the present invention to provide a cursor control device which allows for simultaneous use of the cursor control device and the keyboard.

Still another object of the present invention is to provide a cursor control device which is operated by a natural and ordinary human movement.

SUMMARY OF THE INVENTION

An apparatus and method for controlling the cursor on a computer display is provided which translates the motion of an operator's head into movement of the cursor. A headset including ultrasonic receivers is placed over the head of an operator. A transmitter which is placed in close proximity to the computer display transmits ultrasonic signals which are picked up by the receivers of the headset. The phases of these signals are continuously compared, and the phase difference information is provided to the computer which calculates and executes appropriate cursor movement.

The above and other features and objects of the present invention will become apparent to those skilled in the art from the following detailed description which should be read in light of the accompanying drawings.

Appendix 1, which follows the specification, contains a listing of computer instructions in 8086 Assembly Language and Applesoft ® for controlling the cursor of a computer display according to the present invention.

DETAILED DESCRIPTION OF THE PREFERRED EMBODIMENT

Figure 1:
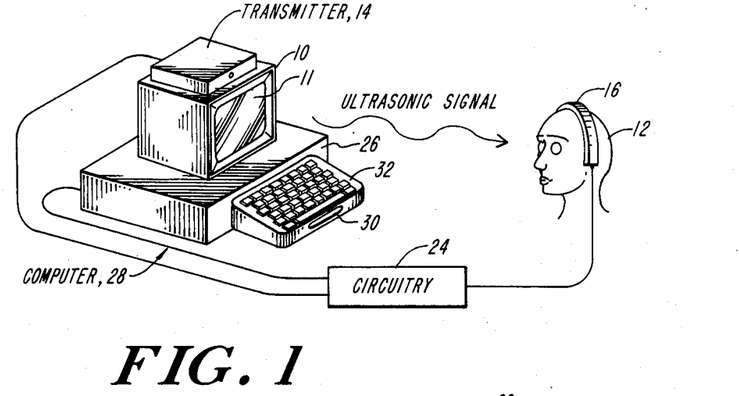
FIG. 1 is a schematic view of a computer system which includes a presently preferred embodiment of the cursor control apparatus of the present invention.

In the embodiment of FIG. 1, there is shown the presently preferred configuration of the cursor control apparatus of the present invention. A computer display 10, in the form of a cathode ray tube (CRT) display, is positioned a distance away from an operator 12 with only air separating the computer display 10 from the operator 12. A transmitter 14 is placed in close proximity to the CRT 10 and is preferably centrally located with respect to the screen 11 of the CRT 10. In the embodiment of FIG. 1 the transmitter 14 is centered on top of the computer display 10. A headset 16, placed around the head of the operator 12, preferably includes three ultrasonic receivers 18, 20 and 22. These receivers are used for receiving signals sent by an ultrasonic transmitter 14, as will be described in detail below. In the embodiment of FIG. 1, the headset 16 is connected to a circuitry box 24 which in turn is connected to thhe ultrasonic transmitter 14. There is also a connection from the circuitry 24 to the computer port 28 which is reserved for cursor control information.

To control a cursor with the cursor control device and method of the present invention, an operator places the headset 16 containing the receivers 18, 20, 22 over his head. An actuating switch 30, which is preferably included on the keyboard 32, is depressed to activate cursor movement. The operator then moves his head in the direction in which he desires to move the cursor on the screen he is facing. Only rotational movements of the head either upward, downward or to a side will effect movement of the cursor. Movements toward or away from the screen will for the most part not cause movement of the cursor. Once the cursor has arrived at its desired location on the computer output device, the actuating switch 30 is deactivated so as to lock the cursor in that desired position, and further movement of the head will not cause corresponding movement of the cursor.

Figure 2:
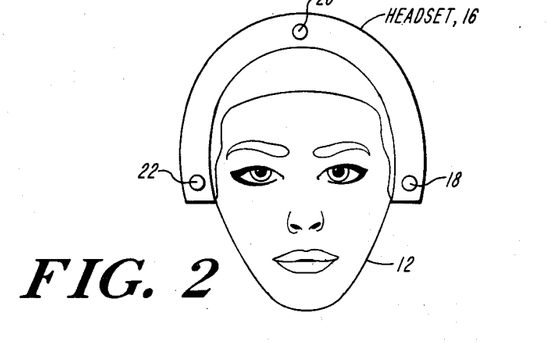
FIG. 2 is a schematic view of the orientation of receivers attached to a headset worn by an operator.

Referring now to FIG. 2, the headset 16 with three ultrasonic receivers 18, 20, 22 is shown around the head of the operator 12. The left and right receivers 18, 22 are arranged so that when the headset is placed on the operator's head, they both lie along a substantially horizontal line. The cursor control apparatus works especially well when receivers 18, 22 are placed along a true horizontal line. Preferably, the headset 16 is positioned on the operator's head in such a way that the left and right receivers 18, 22 are situated slightly above the level of the ears—the lower, the better. The top receiver 20 is located at a substantially central location between receivers 18, 22 and at a location a distance above the left and right receivers 18, 22. Other arrangements of the receivers may also be utilized provided that all of the receivers do not lie along the same line.

The above-described arrangement is preferred because the horizontal dimension is pure and the vertical dimension is easily computed. Also, if the cursor is only to be moved over a one dimensional path, then only two receivers are needed.

Figure 3:
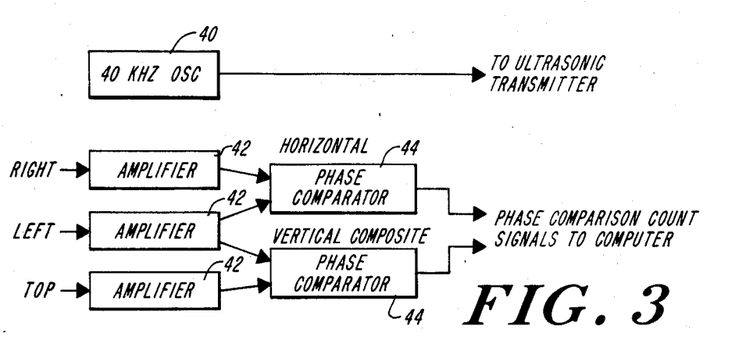
FIG. 3 is a schematic diagram of the signal processing circuitry for the cursor control device of the present invention.

In one embodiment of the cursor control apparatus of the present invention, the circuitry 24 includes an oscillator 40, which provides an oscillating signal for the ultrasonic transmitter 14. While transponders operating at various ultrasonic frequencies are suitable for use in the present apparatus, a 40 kHz transponder has been chosen for the preferred embodiment because it is readily available, it is well beyond the range of hearing, and it provides waves of a wavelength of about $\frac{1}{3}$ of an inch. Waves of such lengths facilitate detection and control of the wavelength cycles. It is important that the transponder chosen be as wide beamed as possible so that if an operator is not directly facing the computer display, movement of the operator's head can still be detected.

In operation, the 40 kHz oscillator 40, shown in FIG. 3, sends signals of this chosen frequency to the transmitter 14. The transmitter 14 in turn sends an ultrasonic wave through the air which is picked up by the three receivers 18, 20 and 22. Each of the received signals are amplified by amplifiers 42 (which will be described in greater detail below) in order to facilitate signal processing. The amplified signal from the right receiver 22 and from left receiver 18 are compared by phase comparator 44 (which will also be described in greater detail below) to produce a signal proportional to the phase relationship of those two signals and which is fed to the computer via port 28 to be used to calculate the horizontal position component (i.e. along the X axis). The amplified signals from the left receiver 18 and from the top receiver 20 are also compared to provide the phase relationship of these signals for determining a vertical position component (i.e. along a Y axis) by necessary calculations.

Figure 4:
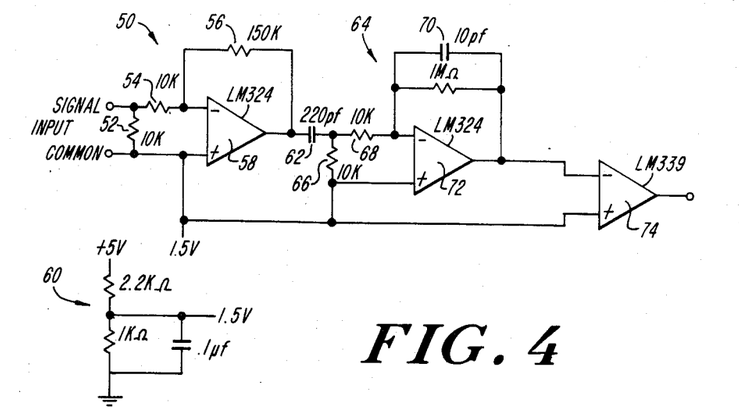
FIG. 4 is a circuit diagram of an amplifier schematically shown in FIG. 3.

Referring to FIG. 4, the amplifier 42 includes two stages of negative feedback amplification and a further amplifier for converting the amplified analog signal into a digital signal. In the first stage 50, resistor 52 is provided to stabilize the circuit by loading the input signal. Resistor 54 reduces the input signal, and resistor 56 provides negative feedback control for amplifier 58. The power for operating amplifier 42 is taken from the computer's 5 V supply voltage. A voltage divider 60 is used for dividing this 5 V power supply into the 1.5 V necessary for operating the amplifiers. The second amplifier stage 64 is capacitively coupled to the first stage 50 by capacitor 62. In the second stage 64, a resistor 66 provides DC bias, and resistor 68 provides gain control for this feedback amplifier circuit. A feedback capacitor 70 is also provided for reducing gain at high frequencies. The amplified signal from amplifier 72 is fed to amplifier 74 which provides a digital signal from the amplified analog signal supplied by the second amplifier stage 64.

Figure 5:
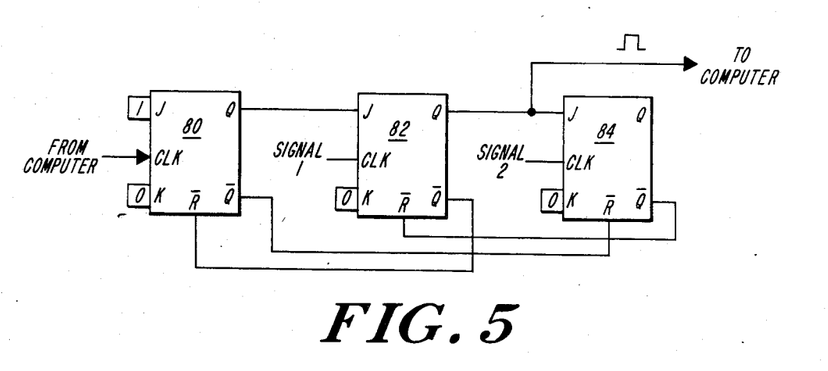
FIG. 5 is a circuit diagram of a phase comparator schematically shown in FIG. 3.

Referring now to FIG. 5, there is shown the phase comparator 44 which compares the phase relationships between the signals transmitted to receivers 18, 20 and 22. The phase comparator 44 includes JK flip-flops 80, 82, 84. Suitable flip-flops are manufactured by Motorola and sold under the designation SN74LS112A. In operation, all the flip-flops are initially in an off state, i.e. all Q outputs are low. Once the computer signals it is ready, a transition signal from the computer causes the first JK flip-flop 80 to set, thereby causing $\overline{Q}$ to go low. As a result, JK flipflop 84 is reset. Then, when an amplified signal from one of the receivers is fed to flip-flop 82, flip-flop 82 becomes set, and the $\overline{Q}$ output of flip-flop 82 goes low resetting flip-flop 80. As a result, flip-flop 80 cannot be set until flip-flop 82 has finished processing the amplified signal received from the receiver. Also, at this point, flip-flop 84 is no longer being actively reset. In the preferred form, the signal (signal 1) received by flip-flop 82 is sent by the left receiver 18, and the signal (signal 2) received by flip-flop 84 is sent by either the top 20 or right receiver 22. The output from flip-flop 82 provides a width-modulated pulse to the computer which is used to determine the appropriate direction and amount of movement of the cursor. The width of the pulse is determined by the amount of time flip-flop 82 is set. Flip-flop 82 becomes reset once the signal from either the right 22 or top receiver 20 sets flip-flop 84 thereby causing $\overline{Q}$ to go low thereby resetting flip-flop 82. This rather complicated phase comparator is necessitated by the fact that, while a simple logic circuit (such as an AND gate) can perform phase comparisons, such simple logic circuits will not give a signed phase comparison. In the present invention, the phase comparator must provide a signed output so that the computer can determine in which direction the head moves.

In determining the correct position changes, the phase relationships are examined as frequently as is practical in order to keep track of the movement of the head. These calculations must take place at least once during each half wavelength of movement. In one embodiment, in order to obtain suitable performance, the wave is sampled at 1000 times per second thereby allowing the system to track movements of over 10 feet per second. This rate is more than adequate for head movements since the head will not practically move more than 10 feet per second. Since the 40 kHz ultrasonic wave has a length of about ⅓ of an inch, and a time base of 4 MHz is easily achievable, a phase measurement resolution of 100 counts per cycle is convenient. This translates to a resolution of 300 parts per inch, which will enable the apparatus to track rather fine movements.

Movement of the headset is translated into movement of the cursor through measurements of phase changes in the ultrasonic wave picked up by receivers 18, 20, 22. The computer 26 tracks and stores changes in phase counts from one measurement to the next. The phase count measurements are processed to provide position change information signals for moving the cursor on the computer display. When the control switch 30 is activated, the computer 26 accepts the position change information signals and moves the cursor accordingly.

By using the relationships between the waves picked up by the receivers, only upward, downward or sideward rotational movements are recognized. Since there is no change in the phase reltionships of signals received by two receivers when an operator moves his head in a straight path toward or away from the transmitter 14, there will be no change in the cursor position caused by such movement.

The software in Appendix 1, which controls the computer processes described above, may be modified so as to adjust a scale factor which determines the amount of cursor movement caused by a given amount of head movement. The software also includes a provision for a hysteresis dead zone which is necessitated by the fact that it is very difficult for an operator to keep his/her head perfectly still. This dead zone allows small head movements to be made without causing corresponding cursor movement. Preferably, the software includes the capability of allowing the scale factor to be adjustable by the operator. Also, the scale factor can be made dependent on the velocity of the head movement.

While the apparatus and method for providing cursor movement corresponding to movement of a user's head of the present invention has been described with reference to a preferred embodiment, various modifications and alterations will occur to those skilled in the art from the foregoing detailed description and the accompanying drawings. For example, the various connections from the head set to the circuitry to the computer and the computer display may be optical fibers or wireless connection using infrared, ultrasonic or radio signals. In addition, relative movement can be determined on the basis of a pulse time interval as opposed to phase comparison. Also, while the invention has been described with reference to a CRT, the device and method of the present invention are equally applicable to any other computer display which has a position indicating symbol. Finally, while the preferred embodiment includes a transmitter mounted on a CRT and three receivers on the operator's head, the invention could also be practiced with a transmitter on the operator's head and three receivers on the CRT. These and other modifications and variations are intended to fall within the scope of the appended claims.

APPENDIX 1

```
]\
]LIST

10   PRINT "MP DEVELOPMENT DISK #3"
20   PRINT "1213PM 28FEB84 KEITH BOSTON"
25   PRINT "808AM 24MAR84"
30   PRINT "64K TASC, ETC."
35   D$ = CHR$ (13) + CHR$ (4)
50   PRINT D$ + "BLOAD START 8088" + D$ + "BRUN MPTWA LOAD 8088" + D$ + "RU
     N MOUSE"

]LOAD MOUSE
]LIST

10   REM   MOUSE 1211PM 28FEB84 KEITH BOSTON
20   REM   STEREO MOUSE DEVELOPMENT
23   REM   DEPENDS ON TWO-AXIS 8088 COROUTINES
```

```
25   REM ! INTEGER *
40   REM  USES JOHN BELL INTERFACE IN SLOT 5
50   REM  WITH EXTERNAL PHASE COMPARE HARDWARE
60   REM  AND EXTERNAL COUNTER
90   AD =  - 15104: REM  A = 50432: REM$C500
95   POKE 768 + 8,4
96   POKE 768 + 16 + 8,4
100 :
105   HGR : HCOLOR= 3
110  A = 772
120  Y = 100
121  AY = A + 16
140   HPLOT XX,YY
150   GOTO 300
200 :
210   FOR X = 0 TO 279
230  Y =  PEEK (772) / 2
240   HPLOT X,Y
250   NEXT
290   INPUT I$
299   GOTO 200
300  X =  PEEK (A):Y =  PEEK (AY)
310   IF Y > 150 THEN Y = 150
340   IF X < > XX OR Y < > YY THEN  HCOLOR= 3: HPLOT X,Y: HCOLOR= 0: HPLOT
     XX,YY:XX = X:YY = Y
350   GOTO 300
700 :
710   FOR I = 768 TO 768 + 30
720   PRINT  PEEK (I)" ";
730   NEXT
735   PRINT
740   GOTO 700
800   REM START 8088
810   CALL 800: STOP
900   REM  STOP 8088
910   POKE 49392,0: STOP

]

;MPTWA-23.MA4   842pm 26mar84 KEITH BOSTON
;8088 MOUSE PROJECT  TWO AXIS  POSITION TRACKER, ULTRASONIC ;40KHZ TRANSDUCERS FROM MICROMINT
;HARDWARE PHASE DETECTOR, 3.58 .MHZ
;NEW HARDWARE: SELF-STARTING, ZERO-BASED, LATCHED
;JOHN BELL 6522 IN SLOT 5, PORT B = X, PORT A = Y
;        PORT C IS MOUSE OUTPUT TO Macintosh: L,R,U,D OUT; SW, ON/OFF IN

;HOW TO ASSEMBLE AND LINK:
;ASSEMBLER DISK IN A
;TEXT DISK IN B

;          A>SUBMIT ASM MPTWA-23.MA4
;          A>GENCMD MPTWA-23 8080
;          A>DDT
;          -iMPTWA-23.CMD
;          -r3680           ;was 3E80 before Cseg added
;          ^C
;          A>BOOT
;
;          load DOS 3.3 MP DEVELOPMENT DISK
;          ]BSAVE MPTWA-23.MA4 FROM CPM,A$5000,L$250
;          ]BLOAD LOAD 8088 AT 1032
;          ]BLOAD MPTWA-23.MA4 FROM CPM,A$1032
;          ]BSAVE MPTWA LOAD 8088,A$1000,L$290
;          boot disk to
;          BRUN MPTWA LOAD 8088
;          BLOAD START 8088 (,A$320,L$32)
;          RUN MOUSE PROGRAM IN APPLESOFT
;          to start from Applesoft: CALL 800
;          to stop from Applesoft:  POKE 49392,0 (ALF in slot 7)
```

```
;APPLESOFT INTEGERS: HI BYTE, LO BYTE
;8088 NORM:         LO BYTE, HI BYTE

CSEG 80H
        ORG 0
        DSEG 80H
        ORG 100H
        CSEG $

XPOSITION EQU ES:.300H              ;RESULTS RETURNED TO APPLE MEMORY
XSMOOTHED EQU ES:.302H
XSCALED   EQU ES:.304H
XSHIFT    EQU ES:.308H

YPOSITION EQU ES:.310H              ;RESULTS RETURNED TO APPLE MEMORY
YSMOOTHED EQU ES:.312H
YSCALED   EQU ES:.314H
YSHIFT    EQU ES:.318H

PORTB     EQU ES:.0C500H            ;JOHN BELL 6522 IN SLOT 5
PORTA     EQU ES:.0C501H
;CB2PULSE EQU ES:.0C50CH
PORTC     EQU PORTA+128

START:
        MOV AX,CS
        MOV DS,AX            ;DS=CS
    MOV AX,1000H
    MOV ES,AX           ;ES=apple
    MOV BYTE PTR CB2PULSE,160       ;SET PORTB MODE TO PULSE CB2 ON WRITE
    MOV BYTE PTR PORTC+2,15         ;SET PORTC LO HALF TO OUTPUT INIT:
    XOR AX,AX       ;CURRENT PHASE READING: Y HI, X LO
    XOR BX,BX       ;Y SMOOTHED POSITION
    XOR CX,CX
    XOR DX,DX       ;Y POSITION
    XOR BP,BP       ;PREVIOUS PHASE READING: Y HI, X LO
    XOR SI,SI       ;X SMOOTHED POSITION
    XOR DI,DI       ;X POSITION LOOP:
    PUSH BX ! PUSH DX
    CALL GET4                       ;GET THE AVERAGE OF 4 GOOD READINGS
    POP DX ! POP BX ;COMPUTE DIFF=CUR-PREV
    XCHG CX,BP ! CALL PHASEDIF
    CALL PHASEDIF ! XCHG CX,BP      ;answers are signed bytes!
    ;NOW BP HAS BEEN UPDATED, AND AX CONTAINS THE DIFFERENCES

TEST BYTE PTR PORTC,20H         ;CHECK ON/OFF CONTROL
    JZ LOOP

;COMPUTE X POSITION=POS+DIFF
    MOV CL,AH ! CBW
    ADD DI,AX
    CMP DI,-10
    JGE LOOP3
    MOV DI,-10
LOOP3:  CMP DI,256*4+10 ! JLE LOOP4 ! MOV DI,256*4+10
LOOP4:

;COMPUTE Y POSITION=POS+ 2*YDIFF - XDIFF
    XCHG AX,CX ! CBW
    SAL AX,1 ! SUB AX,CX
    ADD DX,ax
    CMP DX,-10
```

```
                JGE LOOP3Y
                MOV DX,-10
LOOP3Y: CMP DX,256*4+10 ! JLE LOOP4Y ! MOV DX,256*4+10
LOOP4Y:

;               ;ADD IN TO SMOOTHED POSITION
;               MOV CL,BYTE PTR XSHIFT   ;SET UP SHIFT COUNT
;               MOV AX,SI
;               SUB AX,DI
;               JS LOOP4A
;               SAR AX,CL
;               SUB SI,AX
;               JMPS LOOP4B
;LOOP4A:        NEG AX
;               SAR AX,CL
;               ADD SI,AX
;LOOP4B:
;
;               CMP SI,0 ! JGE LOOP5 ! MOV SI,0
;LOOP5: CMP SI,256*4-1 ! JLE LOOP6 ! MOV SI,256*4-1
;LOOP6:

;CHANGE SMOOTHED POSITION BY 1 IF DIF>1
        MOV AX,DI ! SUB AX,SI
        CMP AX,1 ! JG LOOP4G
        CMP AX,-1 ! JGE LOOP6

;COUNT DOWN
        DEC SI ! JNS LOOP5 ! MOV SI,0
LOOP5:  MOV CX,SI                           ;CLEAR AN INDEX
        MOV SI,X ! MOV AL,CTDOWN[SI] ! AND AX,3 ! MOV X,AX   ;COUNT DOWN IN QUADR
ATURE
        MOV SI,CX
        JMPS LOOP6

LOOP4G:         ;COUNT UP
        INC SI ! CMP SI,256*4-1 ! JLE LOOP4H ! MOV SI,256*4-1
LOOP4H: MOV CX,SI                           ;CLEAR AN INDEX
        MOV SI,X ! MOV AL,CTUP[SI] ! AND AX,3 ! MOV X,AX   ;COUNT UP IN QUADRATUR
E
        MOV SI,CX
LOOP6:

;SCALE SMOOTHED X POSITION
        MOV AX,SI
        SAR AX,1 ! SAR AX,1

;PUT RESULTS IN APPLE
        MOV WORD PTR XPOSITION,DI
        MOV WORD PTR XSMOOTHED,SI
        MOV WORD PTR XSCALED,AX

;               ;ADD IN TO SMOOTHED POSITION, AGAIN FOR Y
;               MOV CL,BYTE PTR YSHIFT   ;SET UP SHIFT COUNT
;               MOV AX,BX
;               SUB AX,DX
;               JS LOOP4AY
;               SAR AX,CL
;               SUB BX,AX
;               JMPS LOOP4BY
;LOOP4AY: NEG AX
;               SAR AX,CL
;               ADD BX,AX
;LOOP4BY:
;
;               CMP BX,0 ! JGE LOOP5Y ! MOV BX,0
;LOOP5Y:        CMP BX,256*4-1 ! JLE LOOP6Y ! MOV BX,256*4-1
;LOOP6Y:

;CHANGE Y SMOOTHED POSITION BY 1 IF DIF>1
```

```
            MOV AX,DX ! SUB AX,BX
            CMP AX,1 ! JG LOOP4GY
            CMP AX,-1 ! JGE LOOP6Y

;COUNT DOWN
            DEC BX ! JNS LOOP5Y ! MOV BX,0
LOOP5Y:     MOV CX,SI                           ;CLEAR AN INDEX
            MOV SI,Y ! MOV AL,CTDOWN[SI] ! AND AX,3 ! MOV Y,AX   ;COUNT DOWN IN QUADR
ATURE
            MOV SI,CX
            JMPS LOOP6Y

LOOP4GY:                    ;COUNT UP
            INC BX ! CMP BX,256*4-1 ! JLE LOOP4HY ! MOV BX,256*4-1
LOOP4HY:        MOV CX,SI                       ;CLEAR AN INDEX
            MOV SI,Y ! MOV AL,CTUP[SI] ! AND AX,3 ! MOV Y,AX   ;COUNT UP IN QUADRATUR
E
            MOV SI,CX
LOOP6Y:

;SCALE SMOOTHED POSITION for y
            MOV AX,BX
            SAL AX,1 ! SUB AX,SI ! SAR AX,1 ;return simple y-x/2
            SAR AX,1 ! SAR AX,1

;PUT RESULTS IN APPLE
            MOV WORD PTR YPOSITION,DX
            MOV WORD PTR YSMOOTHED,BX
            MOV WORD PTR YSCALED,AX

;PUT OUT MOUSE BITS
            MOV AX,Y
            SAL AX,1 ! SAL AX,1
            ADD AX,X
            MOV BYTE PTR PORTC,AL

JMP LOOP

X           DW 0             ;MOUSE QUADRATURE OUTPUT BITS
Y           DW 0
CTDOWN      DB 2,0,3,1       ;DIGITAL QUADRATURE FUNCTIONS FOR COUNTING
CTUP        DB 1,3,0,2

PHASEDIF:             ;DIF = CUR - PREV
            ;SIGNED = UNSIGNED - UNSIGNED
            ;THEN SWAP HI-LO

;AL = AL-CL
            ;CL = ORIG AL
            ;SWAP BYTES IN A AND C
            ;BRING INTO RANGE: +/- ONE HALF CYCLE

XCHG AL,CL
            SUB AL,CL
            CMP AL,45 ! JLE PHASE1 ! SUB AL,90
PHASE1:     CMP AL,-45 ! JGE PHASE2 ! ADD AL,90
PHASE2:     XCHG AL,AH ! XCHG CL,CH
            RET

ABORT:      POP AX ! POP DX ! POP BX
            RETF

GET4:       ;GET THE AVERAGE OF 4 GOOD READINGS
            ;MUST ALL BE WITHIN A RANGE OF 30

IN AL,BYTE PTR 0      ;APPLE I/O INTERFACE
            OR AL,AL              ;ASKING FOR ABORT?
            JZ ABORT
```

```
           CALL GET ! MOV DX,AX       ;Y=HI, X=LO
           CALL GET ! MOV CX,AX
           CALL GET ! MOV BX,AX
           CALL GET

CALL FIXDIF ! JA GET4
           CALL FIXDIF ! JA GET4

;RETURN AVERAGE
           PUSH AX ! XOR AH,AH
           ADD AL,BL ! ADC AH,0
           ADD AL,CL ! ADC AH,0
           ADD AL,DL ! ADC AH,0
           SAR AX,1 ! SAR AX,1
           CMP AL,90 ! JBE GET4X ! SUB AL,90
GET4X:     MOV BL,AL ! POP AX

XCHG AL,AH ! XOR AH,AH
           ADD AL,BH ! ADC AH,0
           ADD AL,CH ! ADC AH,0
           ADD AL,DH ! ADC AH,0
           SAR AX,1 ! SAR AX,1
           CMP AL,90 ! JBE GET4Y ! SUB AL,90
GET4Y:     XCHG AL,AH ! MOV AL,BL
           RET

GET:       ;GET ONE VALID READING

PUSH CX
           MOV CX,30                  ;WAIT 100 MICROSECONDS
L:         LOOP L
           POP CX

MOV AL,BYTE PTR PORTB
           CMP AL,BYTE PTR PORTB
           JE GETOKX
           MOV AL,BYTE PTR PORTB     ;IF IT CHANGED THEN NEW HAS TO BE GOOD
GETOKX:

MOV AH,BYTE PTR PORTA
           CMP AH,BYTE PTR PORTA
           JE GETOKY
           MOV AH,BYTE PTR PORTA
GETOKY:

CMP AL,90+10
           JA GETRES                  ;ABORT IF PHASE READING TOO LARGE

CMP AH,90+10
           JA GETRES
           RET

GETRES:    POP AX                     ;TRASH SUBROUTINE RETURN FROM STACK
           JMP GET4

FIXDIF:
           CALL MAXDIF
           JB FIXDIFRET

;MAXIMUM DIFFERENCE IS >30, SO TRY TO FIX UP
;BY ADDING 90 TO ALL THOSE UNDER 30

CMP AL,30 ! JB GET4B ! ADD AL,90
GET4B:     CMP BL,30 ! JB GET4C ! ADD BL,90
GET4C:     CMP CL,30 ! JB GET4D ! ADD CL,90
GET4D:     CMP DL,30 ! JB GET4E ! ADD DL,90
GET4E:

CALL MAXDIF    ;TEST AGAIN
```

```
FIXDIFRET:
        XCHG AH,AL         ;SWAP X AND Y!
        XCHG BH,BL ! XCHG CH,CL ! XCHG DH,DL
        RET
MAXDIF: ;COMPUTE MAXIMUM DIFFERENCE AMONG 4 VALUES: AL - DL
        PUSH AX            ;HI=MAX, LO=MIN

MOV AH,AL

CMP AL,BL ! JBE SIC ! MOV AL,BL
SIC:    CMP AL,CL ! JBE SID ! MOV AL,CL
SID:    CMP AL,DL ! JBE SIE ! MOV AL,DL
SIE:

CMP AH,BL ! JAE DIC ! MOV AH,BL
DIC:    CMP AH,CL ! JAE DID ! MOV AH,CL
DID:    CMP AH,DL ! JAE DIE ! MOV AH,DL
DIE:

SUB AH,AL
        CMP AH,30
        POP AX
ZZZEND: RET

END
```

```
0000 VARIABLES
0139 CTDOWN     013D CTUP        C501 PORTA      C500 PORTB      C581 PORTC
0135 X          0300 XPOSITION   0304 XSCALED    0308 XSHIFT     0302 XSMOOTHED
0137 Y          0310 YPOSITION   0314 YSCALED    0318 YSHIFT     0312 YSMOOTHED

0000 NUMBERS

0000 LABELS
0156 ABORT      023C DIC         0242 DID        0248 DIE        01F2 FIXDIF
0218 FIXDIFRET  01BD GET         015A GET4       01FD GET4B      0205 GET4C
020D GET4D      0215 GET4E       0198 GET4X      01B6 GET4Y      01D3 GETOKX
01E4 GETOKY     01EE GETRES      000F INIT       01C1 L          001D LOOP
0043 LOOP3      005C LOOP3Y      004C LOOP4      0090 LOOP4G     00EE LOOP4GY
009A LOOP4H     00F8 LOOP4HY     0065 LOOP4Y     0079 LOOP5      00D7 LOOP5Y
00AF LOOP6      010D LOOP6Y      0221 MAXDIF     014B PHASE1     0151 PHASE2
0141 PHASEDIF   022A SIC         0230 SID        0236 SIE        0000 START
024E ZZZEND
```

What is claimed is:

1. An apparatus for controlling the movement of a cursor of a computer display in response to corresponding movement of an operator's head, comprising:
   transmitting means for generating and transmitting an ultrasonic signal of a suitable frequency or frequencies;
   receiving means mountable relative to the operator's head so as to move with said head and so as to receive signals transmitted by said transmitting means, said receiving means including at least two individual ultrasonic receivers;
   means for directly determining the phase of said received signals and producing information signals representing the phase relationship between signals received by respective said ultrasonic receivers;
   processing means for receiving and storing said information signals from said phase determining means, said processing means also analyzing consecutive signals produced by said phase determining means, differences in said analyzed consecutive signals being used to compute position movement information for said cursor;
   means for supplying said position movement information to a controller of the cursor of the computer display.

2. The apparatus for controlling the movement of a cursor of claim 1 further comprising means for activating and deactivating said cursor control apparatus.

3. The apparatus for controlling the movement of a cursor of a computer display of claim 2 wherein said activating means is a component of a keyboard associated with said computer display.

4. The apparatus for controlling the movement of a cursor of claim 1 wherein said transmitted ultrasonic signal has a frequency of approximately 40 kHz.

5. The apparatus for controlling the movement of a cursor of a computer display of claim 1 wherein said processing means further comprises means for producing a signal indicative of both the magnitude and direction of phase change.

6. The apparatus for controlling the movement of a cursor of a computer display of claim 1 further comprising means for adjustably scaling the movement of the cursor in response to operator head movement.

7. The apparatus for controlling the movement of a cursor of claim 1 wherein said received ultrasonic signals are sampled approximately 1000 times per second.

8. The apparatus for controlling the movement of the cursor of claim 1 wherein said transmitting means is positioned at least in part in a centralized location relative to the computer display.

9. The apparatus for controlling the movement of a cursor of claim 1 further comprising means for ignoring small relative movements of the receivers mounted on the operator's head by causing cursor movement only after the head has moved beyond a chosen limit threshold.

10. An apparatus for controlling the movement of a cursor of a computer display in response to corresponding movement of an operator's head, comprising:
   means for generating and transmitting an ultrasonic signal of a suitable frequency or frequencies, said transmitting means being positioned in close proximity to said computer display;
   means for receiving said ultrasonic signals supportable on the head of an operator of the computer display and moveable with the head, said receiving means including three ultrasonic receivers arranged on a headset positionable on a head of the operator, two of said receivers being positioned at opposite ends of said headset along a horizontal line and a third receiver being located off said horizontal line between said two receivers, each of said two receiver positioned along said horizontal line being located near an ear of the operator when the headset is placed over the head of the operator;
   means for converting said ultrasonic signals received by said ultrasonic receivers into an information signal indicative of movement of the operator's head of a form suitable for input into a computer for controlling the movement of said cursor.

11. The apparatus for controlling the movement of a cursor of claim 10 further comprising means for activating and deactivating said cursor control apparatus.

12. The apparatus for controlling the movement of a cursor of a computer display of claim 11 wherein said activating means is a component of a keyboard associated with said computer display.

13. The apparatus for controlling the movement of a cursor of a computer display of claim 10 further comprising means for determining the phase relationship of signals received by said ultrasonic receivers.

14. The apparatus for controlling the movement of a cursor of claim 13 wherein said means for determining the phase relationship comprises means for producing a signal indicative of both the magnitude and direction of phase change.

15. The apparatus for controlling the movement of a cursor of a computer display of claim 10 further comprising means for adjustably scaling the movement of the cursor in response to operator head movement.

16. The apparatus for controlling the movement of a cursor of claim 10 further comprising means for ignoring small relative movements of said receivers mounted on the head of the operator by causing cursor movement only after the head has moved beyond a chosen limit threshold.

17. A method of controlling the movement of a cursor of a computer display in response to corresponding movement of an operator's head, comprising the steps of:
   providing ultrasonic signal transmitting means mounted in proximity to the computer display;
   providing signal receiving means designed to be mounted on the head of the operator, said signal receiving means including at least two individual ultrasonic receivers;
   positioning the operator so that only air separates said transmitting means from said receiving means;
   moving said receiving means through movements of the operator's head;
   directly determining the phase relationship between ultrasonic signals received by said at least two individual ultrasonic receivers;
   comparing two consecutive sets of said phase relationships and creating signals proportional to the difference thereof;
   calculating units of movement for said cursor corresponding to differences in two consecutive sets of phase relationships;
   using said units of movement to control the cursor of the computer display.

18. The method of controlling the movement of a cursor of a computer display of claim 17 further comprising the step of actuating, prior to desiring movement of the cursor, the computer to receive said units of movement to effect movement of the cursor.

19. The method for controlling the movement of a cursor of a computer display of claim 17 wherein said ultrasonic signal has a frequency of approximately 40 kHz.

20. The method for controlling the movement of a cursor of claim 17 wherein said phase relationships between received signals are determined with respect to both magnitude and direction of phase change.

21. The method of controlling the movement of a cursor of a computer display of claim 17 further comprising the step of ignoring small relative movements of the receivers by causing movement of the cursor only after said receivers have moved beyond a chosen limit threshold.

22. An apparatus for controlling the movement of a cursor of a computer display in response to corresponding movement of an operator's head, said apparatus comprising:
   means for generating and transmitting an ultrasonic signal of a suitable frequency or frequencies;
   means for receiving said transmitted ultrasonic signal, said receiving means including at least two individual ultrasonic receivers;
   one of said generating means and said receiving means being located in close proximity to said computer display and the other of said generating means and said receiving means being positioned on the head of the operator;
   means for directly determining the phase of said received signals and producing information signals representing the phase relationship of "between signals received by respective said ultrasonic receivers;".
   processing means for receiving and storing said information signals from said phase determining means, said processing means also analyzing consecutive signals produced by said phase determining means, differences in said analyzed consecutive signals being used to compute position movement information for said cursor;
   means for supplying said position movement information to a controller of the cursor of the computer display.

23. The apparatus for controlling the movement of a cursor of a computer display of claim 22 wherein said transmitted ultrasonic signal has the frequency of approximately 40 KHz.

24. The apparatus for controlling the movement of a cursor of claim 22 further comprising means for ignoring small relative movements of the receivers mounted on the operator's head by causing cursor movement only after the head has moved beyond a chosen limit threshold.

25. The apparatus for controlling the movement of a cursor of a computer display of claim 22 further comprising means for adjustably scaling the movement of the cursor in response to operator head movement.

* * * * *